United States Patent [19]
Kissee

[11] Patent Number: 5,544,740
[45] Date of Patent: Aug. 13, 1996

[54] CONVEYING APPARATUS

[75] Inventor: Darrell E. Kissee, Kenner, La.

[73] Assignee: The Laitram Corporation, Harahan, La.

[21] Appl. No.: 279,538

[22] Filed: Jul. 25, 1994

[51] Int. Cl.⁶ .................................................. B65G 23/06
[52] U.S. Cl. .......................... 198/834; 403/1; 403/362; 474/903
[58] Field of Search .......................... 198/834; 403/1, 403/168, 362; 424/156, 157, 161, 164, 903

[56] References Cited

U.S. PATENT DOCUMENTS 2,804,732  9/1957  Brockley ............................. 403/362
3,724,285  4/1973  Lapeyre ................................. 74/243
4,865,183  9/1989  Hodlewsky et al. .................. 198/834

Primary Examiner—Joseph E. Valenza
Attorney, Agent, or Firm—Leydig, Voit & Mayer

[57] ABSTRACT

A conveying apparatus includes first and second shafts each having a sprocket mounted thereon for rotation with the shafts. A conveyor belt is engaged with the sprockets. A retaining clamp is mounted on one of the shafts adjoining one of the sprockets. The retaining clamp includes a body shaped to fit loosely around the shaft and a force-applying member disposed on the body for pressing the body against the shaft to prevent movement of the body along the shaft.

38 Claims, 4 Drawing Sheets

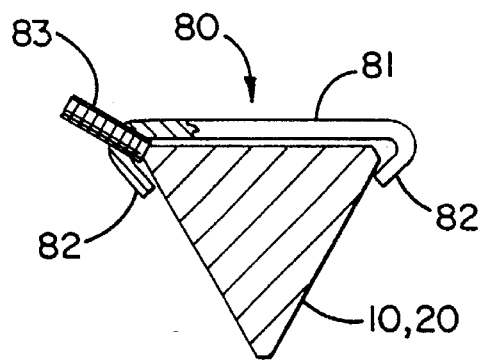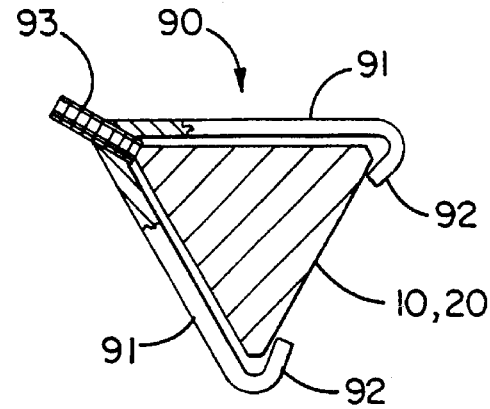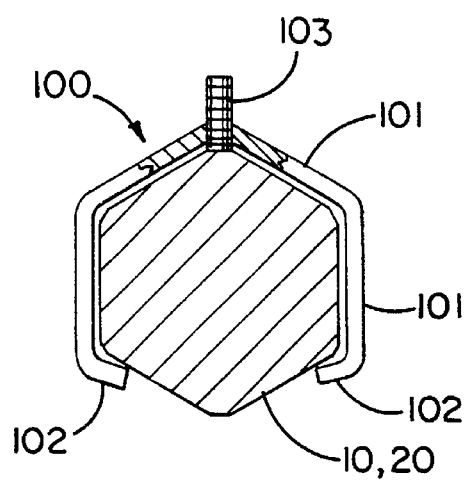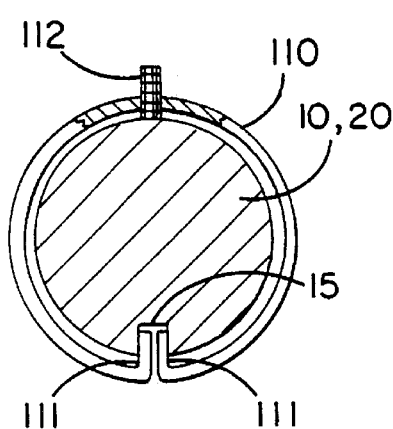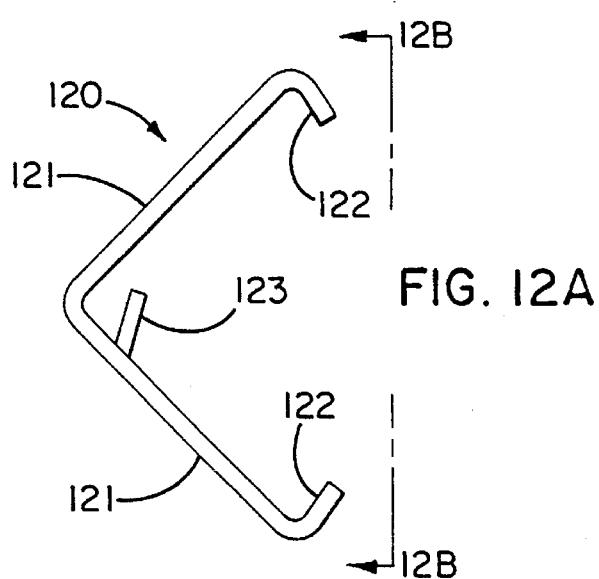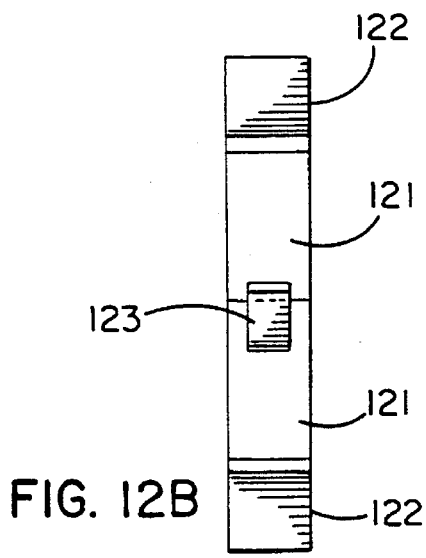

CONVEYING APPARATUS

BACKGROUND OF THE INVENTION

1. Industrial Field of Use

This invention relates to a conveying apparatus, and more particularly to a conveying apparatus having a conveyor belt driven by rotating drive members such as sprockets.

2. Description of the Related Art

In a wide variety of industries, it is common to transport goods within a factory or other facility on a conveying apparatus having a modular conveyor belt. A modular conveyor belt is formed from a plurality of interfitting modules, frequently made of plastic, which can be joined together to make a belt of any desired length by using a suitable number of modules. Each module includes openings sized for engagement with sprockets, which are mounted on shafts at one or more locations along the path of the belt. The belt is driven along its path by rotation of the sprockets.

Typically, a plurality of sprockets are mounted on a shaft in parallel, with each sprocket engaging the conveyor belt at a different location along the width of the belt. At least one of the sprockets is secured to the shaft-to prevent the lateral movement of the sprocket, while the other sprockets are free to slide or "float" laterally along the shaft. The one or more fixed sprockets provide for proper alignment of the conveyor belt, while the floating sprockets can move along the shaft in accordance with the variations in the width of the conveyor belt. Allowing some of the sprockets to float prevents stresses which would be produced in the conveyor belt were all the sprockets fixed in place.

Various arrangements are used in conventional conveyors to fix sprockets to a shaft, including set screws and retaining rings such as C-rings. These conventional arrangements have the drawbacks that it is usually necessary to cut holes or grooves in the shaft to receive the set screws or retaining rings, and this increases the manufacturing costs of the shaft and also weakens the shaft, causing earlier failure. Furthermore, a sprocket can not be secured to a shaft at any desired location, and can only be installed at a small number of locations where the holes or grooves have been formed in the shaft. In addition, in some arrangements, it is necessary to remove all the sprockets from a shaft in order to remove a single retaining ring.

SUMMARY OF THE INVENTION

It is an object of the present invention to provide a conveying apparatus which permits the positions of sprockets on a rotating shaft to be easily adjusted.

It is another object of the present invention to provide conveying apparatus which enables the sprockets to be secured at any desired position on the shaft.

It is yet another object of the present invention to provide a conveying apparatus which does not require holes or grooves to be formed in the shaft in order to secure the sprockets on the shaft.

It is a further object of the present invention to provide a drive arrangement for such a conveying apparatus.

It is a yet further object of the present invention to provide a retaining clamp for mounting a sprocket on a shaft of a conveying apparatus, it being possible to install and remove the clamp with respect to the shaft by hand without having to remove the sprocket from the shaft.

A conveying apparatus according to the present invention comprises first and second rotatable shafts, a plurality of drive members disposed on the shafts for rotation therewith, and a conveyor belt extending around and engaged with the drive members. A plurality of retaining clamps are mounted on the shafts adjoining the drive members. Each retaining clamp has a body shaped to fit loosely around a corresponding one of the shafts and a force-applying member disposed on the body for pressing the body against the shaft to prevent movement of the body along the corresponding shaft.

As a result of the forces applied to the clamp bodies by the force applying members, the clamps are secured to the shafts by friction acting between the surface of the shaft and the clamp. Therefore, it is not necessary to form set screw holes or circumferentially-extending grooves in the surface of the shaft to prevent the movement of the clamps.

The drive members can be any members capable of transmitting drive force between the shafts and the conveyor belt. In preferred embodiments, the drive members are sprockets, and the conveyor belt is a modular conveyor belt.

The force-applying members can be supported by the clamp bodies in various ways. For example, they can be adjustably mounted on the clamp bodies, or they can be integrally formed with the bodies.

The present invention also provides a drive arrangement for a belt-type conveying apparatus. The drive arrangement includes a shaft, a drive member mounted on the shaft for rotation with the shaft and for transmitting drive force-between the shaft and a conveyor belt, and a retaining clamp mounted on the shaft adjoining the drive member. The retaining clamp has a body shaped to fit loosely around the shaft and a force-applying member disposed on the body for pressing the body against the shaft to prevent movement of the body along the shaft.

A retaining clamp according to the present invention includes a body having first and second ends spaced by a gap. The body is shaped to fit loosely around a shaft and a force-applying member disposed on the body for pressing the body against the shaft to prevent movement of the body along the shaft. In preferred embodiments, the clamp can be manually snapped onto and pried off a shaft by substantially elastic deformation of the body.

BRIEF DESCRIPTION OF THE DRAWINGS

FIGS. 6–11, 12a–12b, and 13a–13b illustrate additional examples of retaining clamps which can be employed in the present invention.

Description of Preferred Embodiments

Figure 1:
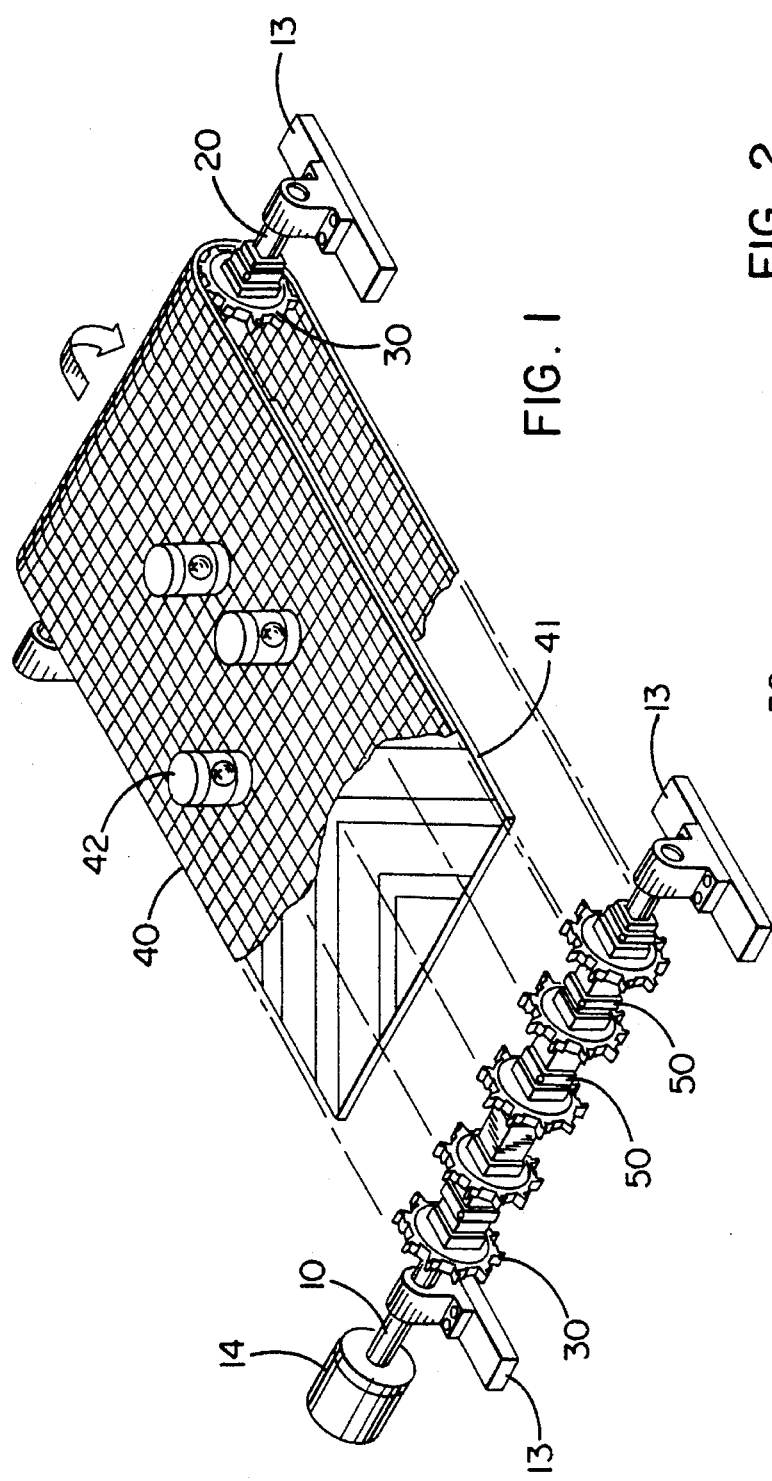
FIG. 1 is a broken-away perspective view of an embodiment of a conveying apparatus according to the present invention.
Figure 2:
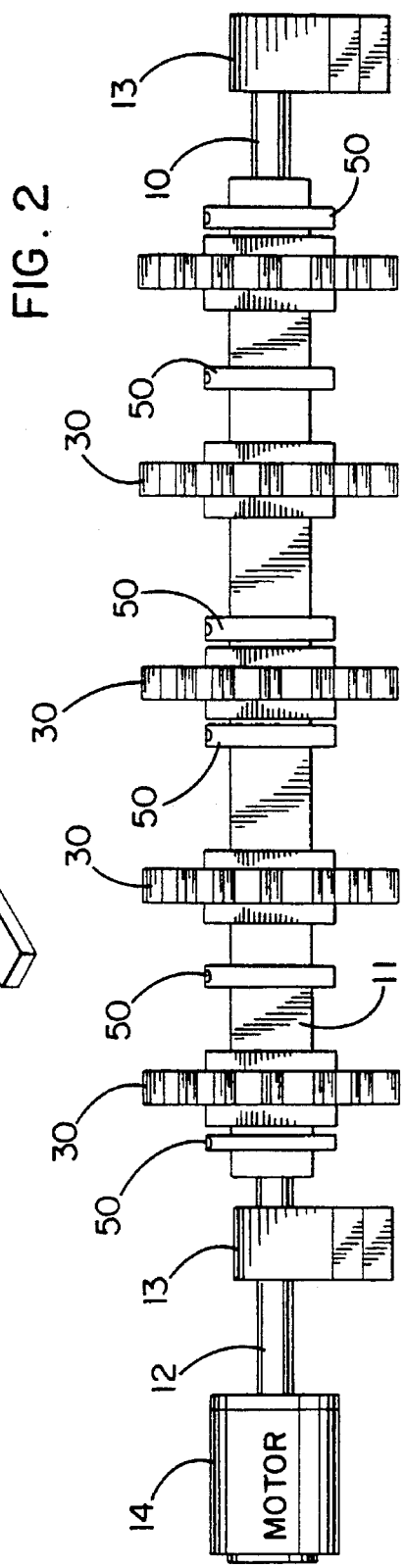
FIG. 2 is a front elevation of the drive shaft of the embodiment of FIG. 1.

A first embodiment of a conveying apparatus according to the present invention is illustrated in FIGS. 1 and 2. This embodiment includes a rotatable drive shaft 10, a rotatable idling or driven shaft 20, and a conveyor belt 40 forming an endless loop around the shafts 10 and 20. A plurality of drive members in the form of sprockets 30 for transmitting force between the shafts 10, 20 and the conveyor belt 40 are mounted on the shafts 10, 20 for rotation therewith. The sprockets 30 on the drive shaft 10 function as drive sprockets and transmit drive force from the drive shaft 10 to the conveyor belt 40, while the sprockets 30 on the driven shaft 20 function as driven sprockets and transmit drive force from the conveyor belt 40 to the driven shaft 20. Items to be conveyed, such as canned goods 42, are transported by movement of the belt 40 along the loop.

Other devices, such as rollers or wheels, can be used instead of sprockets 30 as drive members for the conveyor belt 40 in the present invention. However, in many applications, sprockets are preferred because they provide consistent transmission of drive force without slippage.

The conveyor belt 40 can be any type of belt capable of being driven by engagement with the sprockets 30. An example of a suitable conveyor belt is a modular belt such as that sold by Intralox, Inc. of Harahan, La., which has a plurality of modules interlocked by hinge rods which enable adjacent modules to pivot with respect to each other. A plurality of parallel rows of holes for engagement with the sprockets 30 are formed in each module. The material of which the belt 40 is made can be chosen based on the conditions under which it is used and the items to be transported. Modular belts are frequently made from plastics such as polypropylene, polyethylene, acetal, nylon, and polyurethane, but they may also be made of metal, for example.

The drive sprockets 30 and idling sprockets 30 may be of identical construction. Each sprocket 30 has a plurality of teeth 31 on its outer periphery which can fit into the holes in the conveyor belt 40. The materials of which the sprockets 30 are made will depend upon the materials of which the conveyor belt 40 is made, and can be metal, plastic, or other materials. Each sprocket 30 can be a one-piece member, such as one integrally formed by molding, or it may have two or more sections detachably secured to one another. By detaching the sections from one another, such a multi-piece sprocket can be mounted on or removed from its shaft without disturbing the other sprockets on the same shaft. Both one-piece and multi-piece sprockets are commercially available.

Figure 3:
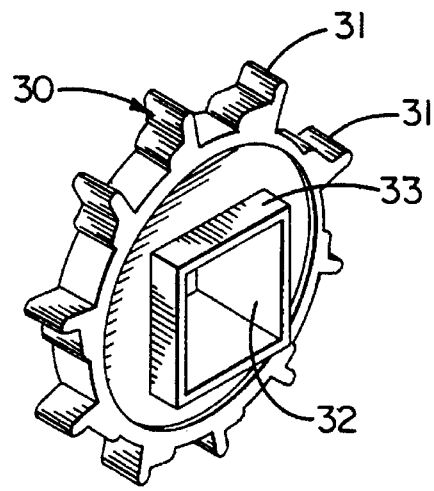
FIG. 3 is a perspective view of one of the sprockets of the embodiment of FIG. 1.

As shown in FIG. 3, each sprocket 30 has a hole 32 at its center which surrounds a similarly shaped portion of the corresponding shaft 10 or 20. In order to give each sprocket 30 stability and maintain the plane of the sprocket 30 substantially perpendicular to the shaft without the sprocket 30 having to be thick over its entire radius, each sprocket 30 may be formed with a hollow flange 33 extending from one or both of its side surfaces with the hole 32 extending through the flanges 33. The shapes of the outer surface of the shaft and of the hole 32 in the sprocket 30 are not critical. They may both be round, in which case suitable rotation-preventing members (such as axially-extending keyways, splines, etc.) are preferably provided on the shaft to prevent the sprocket 30 from rotating with respect to the shaft. Alternatively, the hole 32 and the shaft outer surfaces may have a non-circular shape which prevents the sprocket 30 from rotating with respect to the shaft without the need for any rotation-preventing members. For example, the hole 32 and the shaft can be polygonal (triangular, quadrilateral including rectangular or square, hexagonal, etc.) or of a non-circular curved shape, such as elliptical, or partly circular, such as semicircular. In the illustrated embodiment, each shaft 10, 20 has a portion 11 having a square cross section which supports the sprockets 30, and the holes 32 in the sprockets 30 are likewise square. The ends 12 of each shaft 10, 20 are circular in cross section to enable the shafts to rotate, and the square portions 11 extend continuously between the circular ends 12. However, it is not necessary for the shapes of the shafts to be uniform between their ends, and in regions where there are no sprockets 30, the square portions 11 can be interrupted by portions of a different shape. Each of the square portions 11 in this embodiment has a substantially uniform outer surface between its ends, without any set screw holes or circumferentially-extending grooves such as are required to be formed in the shafts of a conventional conveying apparatus. Although such holes or grooves may be formed in the shafts 10, 20, they are unnecessary in the present invention.

The ends 12 of the shafts 10, 20 are rotatably supported by bearings 13. The drive shaft 10 is rotated about its axis by a drive source, such as an electric motor 14, while the idling shaft 20 is rotated about its axis by engagement between the idling sprockets 30 and the conveyor belt 40. The apparatus may include a conventional mechanism for adjusting the tension in the conveyor belt 40, such as screws which can be turned to vary the distance between the shafts 10, 20. A rigid plate 41 may be disposed beneath the upper or load-carrying portion of the conveyor belt 40 to support the weight of the load-carrying portion and the objects 42 being transported by the belt 40.

Figure 4:
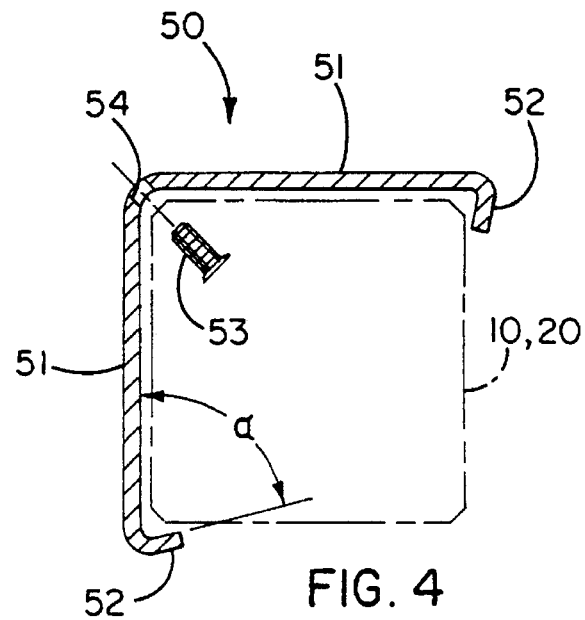
FIG. 4 is a side view of one of the retaining clamps of the embodiment of FIG. 1.
Figure 5:
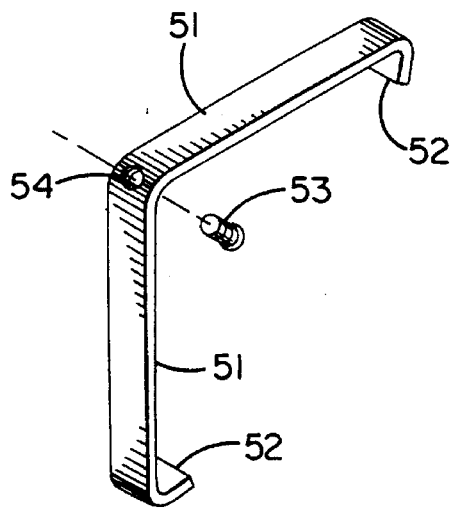
FIG. 5 is a perspective view of the retaining clamp of FIG. 4.

Preferably, the holes 32 in the sprockets 30 are slightly larger than the outer dimensions of the square portions 11 of the shafts so that the sprockets 30 loosely fit over the shafts to permit axial sliding movement of the sprockets 30 in the absence of a lateral restraint. In order to prevent or limit the amount of axial movement of the sprockets 30 along the shafts, each shaft is equipped with a plurality of removable retaining clamps 50. FIGS. 4 and 5 illustrate one of the clamps 50 of this embodiment in detail. The clamp 50 has a body with generally the shape of an L and including two legs 51 intersecting at approximately a right angle. At the outer end of each leg 51 is a flange 52 extending at an angle α to the leg 51. Preferably, the angle α is no greater than 90 degrees, and more preferably the angle is less than 90 degrees so that each flange 52 extends inwards towards one surface of the shaft on which the clamp 50 is mounted, causing the flanges 52 to contact the shaft primarily at the tips of the flanges 52 and enabling the tips to bite into the surface of the shaft by a small extent and increase the resistance of the clamp 50 to lateral forces. In this embodiment, the angle α is approximately 80 degrees, measured between the inner surface of a leg 51 and the inner surface of the corresponding flange 52. The dimensions of the clamp 50 are preferably such that the clamp 50 can loosely fit over one of the shafts 10, 20 without falling off in the radial direction of the shaft. For example, the clamp 50 may fit over the shaft with approximately 3/16 inches of play measured parallel to the surface of the shaft. Therefore, in the illustrated embodiment, the distance between the tip of each flange 52 and the inner surface of the opposing leg 51 is greater than the length of a side of the corresponding shaft, while the distance between the tips of the flanges 52 when the clamp 50 is in a relaxed state is smaller than the diagonal between two opposing corners of the shaft.

In order to increase the ability of the clamp 50 to grip the shaft, the surfaces of the tips of the flanges 52 opposing the shaft can be roughened or formed with projections, claws, serrations, non-skid pads, etc.

Since the shafts 10, 20 in this embodiment are square in the portions 11 where they support the clamps 50, the two legs 51 of each clamp 50 have the same length. If the sides of the shaft are of different lengths, then the two legs 51 of each clamp 50 will be of different lengths.

Each clamp 50 is equipped with a force-applying member for pressing the clamp 50 against the shaft 10, 20 with a force preventing movement of the clamp 50 along the shaft. In this embodiment, the force-applying member is in the form of a set screw 53 engaged in a screw hole 54 passing through the thickness of the clamp 50. The set screw 53 can be turned from the outside of the clamp 50 to be advanced towards or retracted from a surface of the shaft. When the set screw 53 is spaced from or lightly contacting a surface of the shaft, the clamp 50 can freely slide along the shaft. Conversely, when the set screw 53 is advanced so as to firmly contact the outer surface of the shaft, the set screw 53 exerts a force on the clamp 50 which presses the flanges 52 tightly against the sides of the shaft, and friction between the flanges 52 and the shaft prevents the lateral movement of the clamp 50. At this time, the shaft is tightly held by the clamp 50 at three locations, i.e., at the inner end of the set screw 53 and at each of the flanges 52. Because both legs 51 in this embodiment have the same length, the three locations in this instance define the corners of an isosceles triangle. Depending upon the straightness of the legs 51 and the difference between the dimensions of the clamp 50 and the shaft 10, 20, there may be some contact between the shaft and the clamp 50 at locations other than the three points, but it is the frictional contact at the above three locations which is primarily responsible for resisting lateral movement of the clamp 50 in the axial direction of the shaft. Ignoring minute localized deformation of the surface of the shaft 10, 20 where it is contacted by the inner end of the set screw 53 and the tips of the flanges 52, the three contact points of the clamp 50 are substantially flush with the outer surface of the shaft when secured to the shaft by the set screw 53. In contrast, in conventional conveyors, the contact points of retaining members, such as set screws or retaining rings, are recessed beneath the surface of a shaft on which they are mounted.

Depending on the shape of the clamp 50, its center of gravity may not coincide with the rotational center of the shaft on which it is mounted. In this case, the orientation of the clamps 50 as installed on the shaft may be varied among the clamps 50 so as not to create a rotational imbalance.

The set screw 53 may be detachable from the screw hole 54, but if so, preferably it can be removed only towards the inner side of the clamp 50, i.e., in the direction towards the shaft to prevent the set screw 53 from falling out of the screw hole 54 during operation of the conveying apparatus. For example, the inner end of the set screw 53 may be flattened or otherwise enlarged so as to have a larger diameter than the screw hole 54. Alternatively, the inner end of the set screw 53 may be unthreaded so that it cannot be backed out through the screw hole 54.

In this embodiment, the screw hole 54 is positioned in a corner of the clamp 50 where the two legs 51 intersect so that the inner end of the set screw 53 contacts a corner of the shaft 10, 20. To prevent the corners of the shaft 10, 20 from being damaged by the set screw 53, the corners are preferably beveled to provide a flat surface against which the inner end of each set screw 53 can abut.

The set screw 53 is shown as extending substantially along an axis of symmetry of the clamp 50 which passes through the corner of the clamp 50 and midway between the flanges 52. It is not necessary for the set screw 53 to be installed at a corner of the clamp 50, and it can be in any location on the clamp 50 that enables the inner end of the set screw 53 to abut against a surface of the shaft 10, 20 and force the flanges 52 against the shaft. However, the closer the set screw 53 is to the axis of symmetry, i.e., to the corner of the clamp 50, the more uniform will be the forces exerted on the shaft by the two flanges 52. In addition, if the set screw 53 is located near one of the flanges 52, the set screw 53, when tightened, will exert a force on the clamp 50 in a direction acting to pry the clamp 50 from the shaft. Therefore, disposing the set screw 53 near where the legs 51 of the clamp 50 intersect is preferred.

The clamps 50 are preferably fairly rigid so that forces to which they are subjected during normal operation of the conveying apparatus will not deform the clamps 50 to the extent that they can come loose from the shafts 10, 20. At the same time, the clamps 50 are preferably sufficiently elastically deformable that they can be easily and repeatedly snapped into place over the shafts or pried off the shafts manually, using a screw driver, for example. In other words, the deformation of the clamps 50 when they are installed on or removed from the shafts 10, 20 is preferably primarily elastic deformation. Alternatively, if the clamps 50 are too rigid or brittle to be easily snapped into place and pried off, they can be installed on and removed from a shaft 10, 20 by slipping them over an end of the shaft and then sliding them along the shaft to a suitable location. The clamps 50 can be made of various materials, including metals (such as aluminum, carbon steel, or stainless steel), polymeric materials (such as polysulfone), and composites of more than one type of material. The thickness of each clamp 50 and its width measured in the axial direction of a shaft 10, 20 can be selected based on considerations of strength, rigidity, and ease of handling.

On each shaft 10, 20, it is desirable to substantially fix in place at least one of the sprockets 30 so as to maintain a proper alignment of the conveyor belt 40, while the other sprockets 30 can be allowed to "float", i.e., slide in the axial direction of the shaft. As shown in FIG. 2, in this embodiment, a single sprocket 30 (the centermost one in FIG. 2) on each shaft 10, 20 is substantially fixed in place, while the remainder are free to float. The fixed sprocket 30 is restricted in movement by two clamps 50 installed on the shaft 10, 20 on either side of the fixed sprocket 30. The clamps 50 can be closely abutting the sides of the fixed sprocket 30 so as to prevent virtually all axial movement, or they can be spaced so as to permit a small amount of axial play by the fixed sprocket 30. For example, in the present embodiment, the clamps 50 for the fixed sprocket 30 allow approximately ¹⁄₁₆ inch of play in each axial direction, or a total of approximately ⅛ inch.

Additional clamps 50 are disposed adjoining the remaining, floating sprockets 30 to limit the range of axial movement of the sprockets 30 in the axial direction of the shafts 10, 20. These clamps 50 prevent the sprockets from bunching up in one location when the belt 40 is removed from the sprockets 30 or if the belt 40 and the sprockets 30 temporarily become disengaged due to a momentary loss of tension in the belt 40. The clamps 50 preferably permit the floating sprockets 30 to have more play in the axial direction of the shafts 10, 20 than the fixed sprocket.

The clamps 50 can be mounted at any location on the square portions 11 of the shafts 10, 20, so there is much greater freedom of installation than in a conventional conveying apparatus employing retaining rings to restrain sprockets, since retaining rings can only be installed in a limited number of locations on a shaft where grooves for the retaining rings have been formed.

In addition, since the shafts. 10, 20 of the illustrated embodiment do not require grooves or set screw holes to prevent movement of the clamps 50, the shafts 10, 20 are less expensive to manufacture than those for a conventional conveying apparatus. Furthermore, since the shafts can have a substantially uniform surface without grooves for retaining rings or holes for set screws, the shafts are less liable to damage by chipping, they have greater strength, and they can be maintained more hygienic, because of having fewer locations where dirt and other foreign matter can accumulate. This advantage is particularly significant when the conveying apparatus is used for transporting raw meat, fruits, and other unpackaged foods.

FIGS. 6–13 show portions of other embodiments of a conveying apparatus according to the present invention, illustrating various types of retaining clamps which can be employed. Each clamp is similar to the clamp 50 of FIG. 4 in that it can preferably be snapped on and pried off a shaft by elastic deformation of the clamp. The clamps may be made of the same materials as the clamp 50 of FIG. 4.

Figure 6:
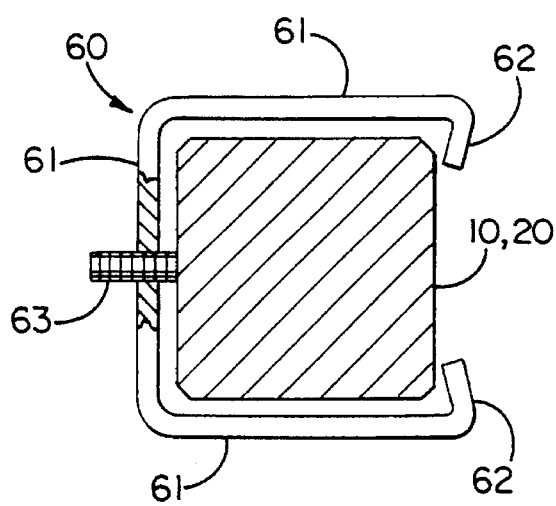

In the embodiment of FIG. 6, the retaining clamp 60 is generally C-shaped and has three legs 61 each longer than a side of a square portion of a rotatable shaft 10, 20 on which the clamp 60 is mounted. The legs 61 intersect each other to define approximately a right angle. Two short flanges 62 separated by a gap extend towards each other from opposite legs 61. A set screw 63 passes through a screw hole in the side of the clamp 60 opposite the gap between the flanges 62. The clamp 60 is preferably somewhat larger than the shaft 10, 20 so that when the set screw 63 does not contact or lightly contacts the shaft, the clamp 60 can slide along the shaft 10, 20. When the set screw 63 is tightened so that its tip bears firmly against the side of the shaft, the two flanges 62 are pressed tightly against the same side of the shaft 10, 20 as each other and prevent the movement of the clamp 60 along the length of the shaft. Like the flanges 52 shown in FIG. 4, the flanges 62 of this embodiment may be angled somewhat towards the surface of the shaft 10, 20 so that the tips of the flanges 62 can firmly engage the shaft to prevent axial slippage of the clamp 60. In other words, if the sides of the shaft 10, 20 are at right angles, the angle between the flanges 62 and the legs 61 from which they extend is preferably less than or equal to 90 degrees. As in the previous embodiment, when the set screw 63 is tightened, the clamp 60 is secured to the shaft 10, 20 primarily by contact at three locations, i.e., at the set screw 63 and at each of the two flanges 62.

Figure 7:
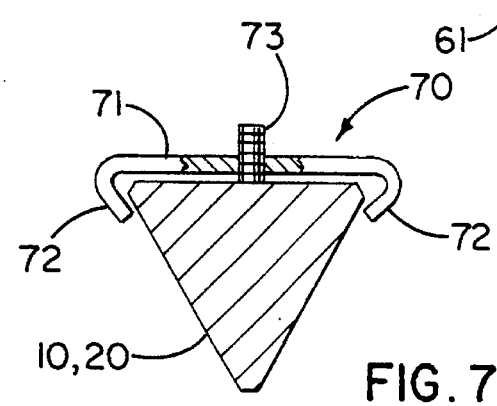

In the embodiment of FIG. 7, the portion of a rotatable shaft 10, 20 on which unillustrated sprockets 30 can be mounted is triangular in cross section. Each retaining clamp 70 for the shaft has a single leg 71 opposing one side of the shaft 10, 20 and having a length greater than that side of the shaft. Two flanges 72 extend at acute angles from the leg 71 to engage with the other two sides of the shaft. Preferably, the angle between each flange 72 and the leg 71 is smaller than the angle of the corner of the shaft over which the flange 72 fits. The distance between the tips of the flanges 72 is smaller than the length of a side of the shaft 10, 20 so that once the clamp 70 is installed on the shaft, the flanges 72 of the clamp 70 prevent it from falling off the shaft. A set screw 73 is mounted in a screw hole in the leg 71 of the clamp 70. When the set screw 73 is not contacting or loosely contacting the shaft, the clamp 70 preferably fits loosely over the shaft so that the clamp 70 can slide in the axial direction of the shaft. When the set screw 73 is tightened to bear firmly against the shaft, the force exerted by the set screw 73 causes the flanges 72 of the clamp 70 to tightly engage with the sides of the shaft 10, 20, thereby rigidly securing the clamp 70 to the shaft by forces exerted at primarily three locations (at the set screw 73 and at each of the flanges 72) to prevent the axial movement of the clamp 70 in the axial direction of the shaft.

The clamp 80 shown in FIG. 8 is similar to the clamp 70 of FIG. 7 in that it has a single leg 81 which extends along one side of a triangular portion of a rotatable shaft 10, 20 and two flanges 82 extending from the ends of the leg 81 a short distance along two other sides of the shaft. A set screw 83 is installed in one of the corners of the clamp 80 where one of the flanges 82 intersects the leg 81 so as to be able to contact one of the corners of the shaft 10, 20. When the set screw 83 is not contacting or loosely contacting the shaft 10, 20, the clamp 80 preferably loosely fits around the shaft, and when the set screw 83 is tightened to bear firmly against a corner of the shaft, at least one of the flanges 82 is brought into tight engagement with the same side of the shaft. Depending upon the angle of the set screw 83 with respect to the leg 81, the end of the flange 82 closest to the set screw 83 may or may not contact the shaft 10, 20 when the set screw 83 is tightened. Thus, the clamp 80 may be secured to the shaft by forces exerted at either three locations (at the set screw 83 and at both flanges 82) or only at two locations (at the set screw 83 and at the flange 82 remote from the set screw 83 or in the corner between the leg 81 and the flange 82 remote from the set screw 83). The corners of the shaft may be bevelled to provide a flat surface for contact with the set screw 83.

FIG. 9 illustrates another embodiment having V-shaped retaining clamps 90 mounted on shafts 10, 20 having triangular portions for supporting unillustrated sprockets 30. Each retaining clamp 90 has two legs 91 intersecting at an acute angle, each leg 91 being longer than a side of the shaft 10, 20. Two flanges 92 separated by a gap extend from the ends of the legs 91. A set screw 93 for contacting a corner of the shaft 10, 20 is installed in the corner of the clamp 90 where the two legs 91 intersect. When the set screw 93 is not contacting or loosely contacting the shaft 10, 20, the clamp 90 preferably loosely fits around the shaft, and when the set screw 93 is tightened to bear firmly against a corner of the shaft, the flanges 92 are brought into tight engagement with the same side of the shaft. Preferably, the two flanges 92 are not parallel to the side of the shaft 10, 20 with which they engage so that the tips of the flanges 92 can bite into the shaft. Namely, the angle between each flange 92 and the leg 91 to which it is attached is preferably less than the angle of the corner of the shaft 10, 20 over which the flange 92 fits.

The embodiment of FIG. 10 has retaining clamps 100 mounted on rotatable shafts 10, 20 with a hexagonal portion for supporting unillustrated sprockets 30. Each retaining clamp 100 has four straight legs 101 which extend along the entire length of four sides of the shaft 10, 20. Two short flanges 102 extend from opposing legs 101 along a portion of the two remaining sides of the shaft. A set screw 103 is installed in a screw hole in a location spaced from the flanges 102, such as in the corner of the clamp 100 most remote from the flanges. 102 with the set screw 103 opposing one of the corners of the shaft 10, 20. When the inner end of the set screw 103 is either spaced from or lightly contacting the shaft, the clamp 100 preferably loosely fits over the shaft so as to be able to slide in the axial direction of the shaft 10, 20. When the set screw 103 is tightened so as to bear firmly against a surface of the shaft, the flanges 102 tightly engage sides of the shaft to prevent the axial movement of the clamp 100. Preferably the flanges 102 are not parallel to the sides of the shaft 10, 20 with which they engage so that the tips of the flanges 102 can bite into the shaft. The set screw 103 can be installed in any location such that the clamp 100 can be firmly mounted on the shaft 10, 20. For example, it can be installed in one of the other corners of the clamp 100, or it can be installed so as to contact one of the flat sides of the shaft rather than a corner of the shaft. In this embodiment, the clamp 100 is secured to the shaft 10, 20 by frictional forces at primarily three locations (at the set screw 103 and at each of the flanges 102).

A clamp for use with a hexagonal shaft may have a different number of legs from the number shown in FIG. 10. For example, the clamp may have three legs extending along three sides of the shaft, or five legs extending along five sides of the shaft.

FIG. 11 illustrates a clamp 110 of an embodiment in which the rotatable shafts 10, 20 have a circular rather than polygonal shape periphery. An axially extending keyway 15 is formed in each shaft 10, 20, and unillustrated sprockets mounted on the shafts are prevented from rotating with respect to the shafts by keys or set screws which engage with the keyway 15. Axial movement of the sprockets is restricted by arcuate retaining clamps 110 having a hollow center and opposing ends separated by a gap. The clamp 110 is not restricted to any particular shape, and can be circular, oblong, polygonal, or have a combination of curved and straight portions. In the illustrated embodiment, the clamp 110 describes an arc of a circle. An inwardly extending flange 111 is formed on each end of the clamp 110 for engagement with the keyway 15. A set screw 112 is mounted on the clamp 110 at a location spaced from the flanges 111, such as on the opposite side of the clamp 110 from the flanges ill. The hollow center of the clamp 110 is sufficiently large that when the set screw 112 is spaced from or only lightly contacts the shaft 10, 20, the clamp 110 can slide in the axial direction of the shaft. When the set screw 112 is tightened against the outer surface of the shaft 10, 20, the flanges 111 are pressed into the keyway 15, and the clamp 110 is held tightly against the shaft by frictional forces exerted primarily at three locations (at the set screw 112 and at each of the flanges 111).

A force-applying member other than a set screw can be employed to press a clamp against the side of a shaft and prevent the axial movement of the clamp. FIGS. 12a and 12b are respectively a side view and a front view of a clamp 120 which can be secured to an unillustrated shaft 10, 20 by a force-applying member in the form of a spring disposed on the inner surface of the clamp 120. Like the clamp 50 shown in FIG. 4, this clamp 120 includes two straight legs 121 intersecting at approximately a right angle and forming the shape of an L. At the outer end of each leg 121 is a flange 122 extending at an angle of at most 90 degrees with respect to the leg 121. The spring comprises an elastically deformable tab 123 formed on one of the legs 121 in the vicinity of the intersection between the two legs 121. The tab 123 extends inwardly from the legs 121 into the space defined by the legs 121, but it is capable of being elastically bent towards the legs 121 when the clamp 120 is mounted on a shaft. The tab 123 can be formed in a variety of ways. For example, if the legs 121 are sufficiently thin, the tab 123 can be punched out of one of the legs 121. Alternatively, the tab 123 can be cast as part of the legs 121, or it can be formed separately from the legs 121 and then attached by welding, bonding, riveting, or other process, depending on the material of which the clamp 120 is made. The free end of the tab 123 is shown extending towards the opposite leg 121 when the tab 123 is in an undeformed state, but it may extend towards the gap between the two flanges 122. The length of the tab 123 is selected in this embodiment so as to press against a corner of a square portion of a shaft on which the clamp 120 is mounted, but the tab 123 may instead press against one of the flat surfaces of the shaft between two corners. The structure of this embodiment is otherwise the same as that of the embodiment of FIG. 4. Once the clamp 120 is snapped onto a shaft, it is secured to the shaft without the need for any adjustment, so it may be faster to install than a clamp using a set screw as a force-applying member. In order to slide the clamp 120 in the lengthwise direction of the shaft, the clamp 120 can be pressed against the shaft by hand to compress the tab 123 between the shaft and the clamp 120, thereby reducing or eliminating the frictional force between the surface of the shaft and the flanges 122. As in the embodiment of FIG. 4, the clamp 120 is secured to the shaft primarily by forces exerted at three locations, i.e., at the tab 123 and at each of the flanges 122.

A force-applying member in the form of a spring can likewise be used with any of the clamps shown in FIGS. 5–11 instead of a set screw.

Figure 13B:
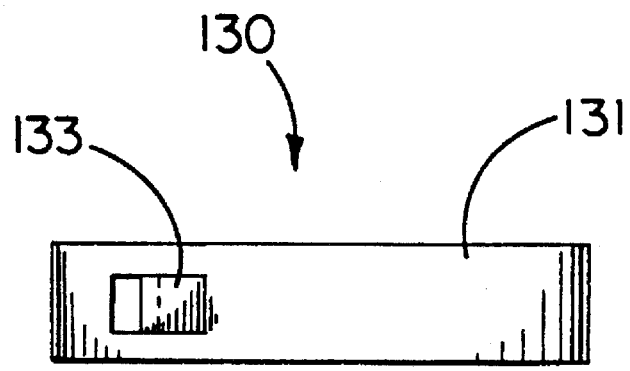
Figure 13A:
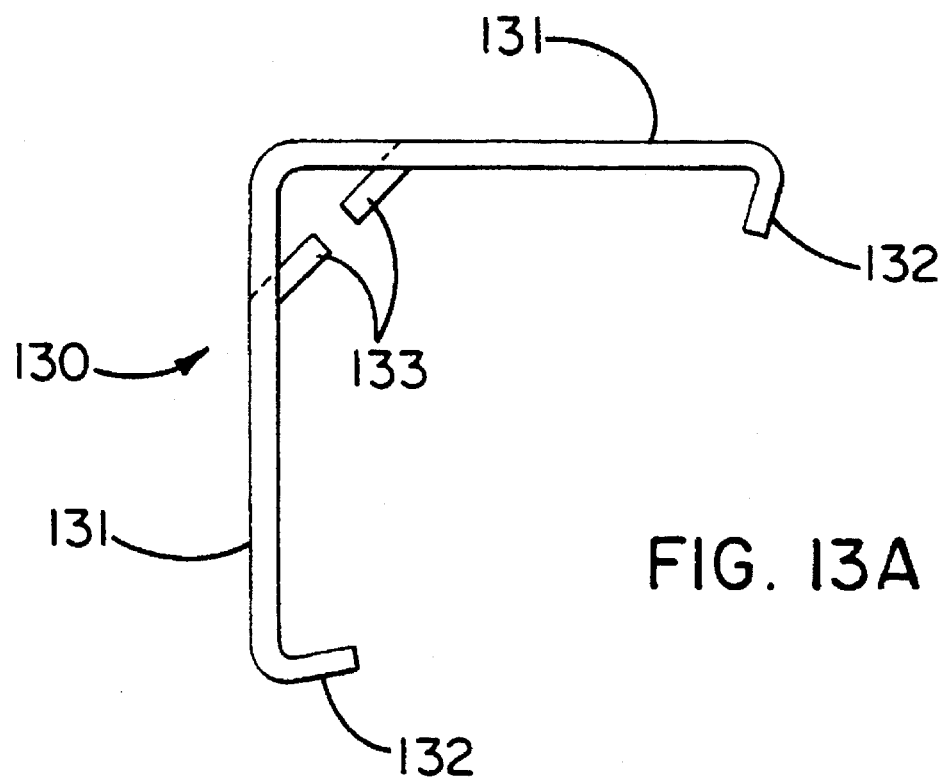

FIGS. 13a and 13b are a top view and a side view of a clamp 130 of another embodiment for use with a shaft 10, 20 having a square portion 11 for supporting unillustrated sprockets 30. The clamp 130 has two straight legs 131 joined in the shape of an L, and flanges 132 corresponding to flanges 52 of the embodiment of FIG. 4 are formed on the ends of the legs 131. A spring in the form of an elastically-deformable tab 133 is formed on each leg 131 near the intersection between the legs 131. The two tabs 133 each have a fixed end integral with one of the legs 131 and a free end extending generally towards each other into the space defined between the legs 131. When the clamp 130 is snapped over a shaft, the tabs 133 are compressed and exert a force pressing the flanges 132 tightly against the shaft. As a result, the clamp 130 is secured to the shaft by forces exerted primarily at four locations, i.e., at each of the two tabs 133 and at each of the flanges 132.

Other types of springs can be used as force-applying members to urge the flanges of a clamp according to the present invention against the side of a shaft. For example, in the embodiment of FIGS. 13a and 13b, the tabs 133 can be replaced by a leaf spring mounted in a corner of the clamp 130 and extending between the two legs 131.

In each of the embodiments described above in which the clamp is mounted on a polygonal portion of a rotatable shaft, the one or more legs of each clamp are straight members extending along a side of the shaft. However, since the straight portions of the legs between the corners of the clamp need not contact the sides of the shaft, it is not necessary for the legs to be straight.

What is claimed is:

1. A drive arrangement for a belt-type conveying apparatus comprising:

a rotatable shaft;

a drive member mounted on the shaft for transmitting drive force between the shaft and a conveyor belt; and a retaining clamp mounted on the shaft adjoining the drive member, the retaining clamp having a body shaped to fit loosely around the shaft and having first and second ends spaced by a gap, and a force-applying member disposed on the body for urging a portion of the body adjoining the force-applying member away from the shaft and pressing the ends of the body against the shaft to prevent movement of the body along the shaft.

2. A drive arrangement according to claim 1 wherein the drive member comprises a sprocket.

3. A drive arrangement according to claim 1 wherein the drive member is loosely mounted on the shaft.

4. A drive arrangement according to claim 1 wherein the force-applying member can exert an adjustable force on the body.

5. A drive arrangement for a belt-type conveying apparatus comprising:

a rotatable shaft;

a drive member mounted on the shaft for transmitting drive force between the shaft and a conveyor belt; and a retaining clamp mounted on the shaft adjoining the drive member, the retaining clamp having a body shaped to fit loosely around the shaft and a force-applying member disposed on the body for pressing a portion of the body against the shaft to prevent movement of the body along the shaft, the body having first and second ends, the clamp being configured to be snapped onto and pried off of the shaft by elastic deformation of the clamp with the shaft passing between the first and second ends as the clamp is snapped onto and pried off of the shaft.

6. A drive arrangement according to claim 1 wherein the shaft has a polygonal transverse cross section and the body of the clamp has one or more straight sides each extending along a side of the shaft.

7. A drive arrangement according to claim 6 wherein the shaft has a quadrilateral transverse cross section, and the clamp is substantially L-shaped.

8. A drive arrangement according to claim 6 wherein the shaft has a quadrilateral transverse cross section, and the clamp is substantially C-shaped.

9. A drive arrangement according to claim 1 wherein:

the shaft has a polygonal transverse cross section with a plurality of sides; and the clamp includes first and second flanges spaced by a gap, each flange opposing a corresponding side of the shaft and being shorter than the corresponding side and being pressed by the force-applying member into frictional engagement with the corresponding side.

10. A drive arrangement according to claim 9 wherein the first and second flanges contact different sides of the shaft.

11. A drive arrangement according to claim 9 wherein the first and second flanges contact a same side of the shaft.

12. A drive arrangement according to claim 9 wherein each flange is angled towards the corresponding side of the shaft.

13. A drive arrangement according to claim 6 wherein the shaft has a triangular transverse cross section.

14. A drive arrangement according to claim 1 wherein the force-applying member comprises an adjustable set screw mounted on the body of the clamp and having an end opposing the shaft.

15. A drive arrangement according to claim 14 wherein the set screw contacts a corner of the shaft.

16. A drive arrangement according to claim 14 wherein the set screw contacts a surface of the shaft between two corners of the shaft.

17. A drive arrangement according to claim 14 wherein the body of the clamp has first and second sides intersecting to define a corner, and the set screw is installed in the corner.

18. A drive arrangement according to claim 14 wherein the set screw is disposed along an axis of symmetry of the body of the clamp.

19. A drive arrangement according to claim 1 wherein the force-applying member comprises a spring elastically deformable to urge the body of the clamp against the shaft.

20. A drive arrangement according to claim 19 wherein the spring is a tab extending from the body of the clamp towards the shaft.

21. A drive arrangement according to claim 20 wherein the tab is integrally formed with the body of the clamp.

22. A drive arrangement according to claim 1 wherein the clamp is in three-point contact with the shaft.

23. A drive arrangement according to claim 22 wherein the three points of contact define an isosceles triangle.

24. A drive arrangement according to claim 1 wherein the clamp is in four-point contact with the shaft.

25. A drive arrangement according to claim 1 wherein:

the shaft is circular and has a groove extending in an axial direction of the shaft; and the body of the clamp includes first and second flanges engaging the groove.

26. A drive arrangement according to claim 1 comprising a plurality of the drive members and retaining clamps mounted on the shaft, two of the clamps being disposed on opposite sides of one of the drive members to restrict the movement of the sprocket in the axial direction of the shaft to at most ⅛ inch.

27. A conveying apparatus comprising:

first and second rotatable shafts;

a plurality of drive members mounted on the shafts for rotation therewith;

a conveyor belt extending around and engaging the drive members; and a plurality of retaining clamps mounted on the shafts adjoining the drive members, each retaining clamp having a body shaped to fit loosely around a corresponding one of the shafts and having first and second ends spaced by a gap, and a force-applying member disposed on the body for urging a portion of the body adjoining the force-applying member away from the shaft and pressing the ends of the body against the shaft to prevent movement of the body along the corresponding shaft.

28. A conveying apparatus according to claim 27 wherein the drive members comprise sprockets.

29. A conveying apparatus according to claim 27 wherein one drive member on each shaft is restricted by the clamps to axial movement of approximately ⅛ inch, while the remaining drive members are free to move by at least ⅛ inch.

30. A conveying apparatus according to claim 27 wherein the conveyor belt comprises a modular conveyor belt.

31. A retaining clamp for use on a shaft of a belt-type conveying apparatus comprising:

a body shaped to fit loosely around the shaft and having first and second ends spaced by a gap; and a force-applying member disposed on the body for pressing portion of the body against the shaft to prevent movement of the body along the shaft.

32. A retaining clamp according to claim 31 wherein the body comprises first and second legs intersecting at approximately a right angle and first and second flanges extending from the first and second legs, respectively, at an angle of at most 90 degrees.

33. A retaining clamp according to claim 32 wherein the legs intersect to form a corner, and the force-applying member comprises a set screw disposed in the corner.

34. A drive arrangement according to claim 5 wherein the shaft has a quadrilateral transverse cross section, and the clamp is substantially L-shaped.

35. A drive arrangement according to claim 5 wherein:

the shaft has a polygonal transverse cross section with a plurality of sides; and the clamp includes first and second flanges spaced by a gap, each flange opposing a corresponding side of the shaft and being shorter than the corresponding side and being pressed by the force-applying member into frictional engagement with the corresponding side.

36. A drive arrangement according to claim 35 wherein the first and second flanges contact different sides of the shaft.

37. A drive arrangement according to claim 35 wherein the first and second flanges contact a same side of the shaft.

38. A drive arrangement according to claim 5 wherein the clamp is in three-point contact with the shaft.

* * * * *